(12) United States Patent (10) Patent No.: US 12,605,974 B2
Bill (45) Date of Patent: Apr. 21, 2026

(54) METHOD OF DETERMINING A TIRE PERFORMANCE CHARACTERISTIC OF A TIRE

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 327 days.

(21) Appl. No.: 18/315,903

(22) Filed: May 11, 2023

(65) Prior Publication Data

US 2023/0364950 A1 Nov. 16, 2023

(30) Foreign Application Priority Data

May 13, 2022 (GB) ...................................... 2207020

(51) Int. Cl.
*B60C 23/04* (2006.01)

(52) U.S. Cl.
CPC ...... *B60C 23/0474* (2013.01); *B60C 23/0484* (2013.01)

(58) Field of Classification Search
CPC ............ B60C 23/0474; B60C 23/0484; B60C 2200/02; B60C 23/04; B60C 23/20
USPC ......................................................... 340/442
See application file for complete search history.

(56) References Cited

U.S. PATENT DOCUMENTS

| | | | |
|---|---|---|---|
| 5,629,873 A | 5/1997 | Mittal et al. | |
| 6,825,758 B1 | 11/2004 | Laitsaari | |
| 7,248,953 B2 * | 7/2007 | Ogawa | B60C 23/061 |
| | | | 73/146.2 |
| 7,661,299 B2 * | 2/2010 | Kusunoki | B60C 23/0408 |
| | | | 73/146 |

(Continued)

FOREIGN PATENT DOCUMENTS

| | | |
|---|---|---|
| EP | 3118030 | 1/2017 |
| EP | 4275921 A1 | 11/2023 |

(Continued)

OTHER PUBLICATIONS

U.S. Appl. No. 18/316,097 Office Action (Aug. 5, 2025)(25 Pages).

(Continued)

*Primary Examiner* — Eric Blount
(74) *Attorney, Agent, or Firm* — Nixon & Vanderhye P.C.

(57) ABSTRACT

A method of determining a tire performance characteristic of a tire including querying, using a processing system, a memory as to a presence of a first set of values indicative of a tire parameter of a tire in the memory, and determining, using the processing system, that the first set of values is insufficient to determine the tire performance characteristic of the tire, The method includes performing steps, using the processing system, comprising one or more of providing an indication that a second set of values indicative of the tire parameter is required to determine the tire performance characteristic of the tire, and retrieving, from the memory, a performance coefficient of the tire corresponding to performance of the tire associated with the first set of values, and determining, based on the performance coefficient, the tire performance characteristic of the tire.

20 Claims, 13 Drawing Sheets

(56) References Cited

U.S. PATENT DOCUMENTS

| | | | | |
|---|---|---|---|---|
| 8,370,019 | B2 * | 2/2013 | Bian | B60T 8/172 |
| | | | | 703/2 |
| 8,599,044 | B2 | 12/2013 | Maggiore et al. | |
| 8,738,308 | B2 * | 5/2014 | Kitano | B60C 23/061 |
| | | | | 73/146 |
| 9,061,662 | B2 * | 6/2015 | Haas | B60T 8/1725 |
| 10,675,925 | B1 | 6/2020 | Oakes, III et al. | |
| 10,994,577 | B2 | 5/2021 | Huard et al. | |
| 2005/0241380 | A1 | 11/2005 | Welch | |
| 2006/0082451 | A1 * | 4/2006 | Shaw | B60C 23/0474 |
| | | | | 340/449 |
| 2010/0023201 | A1 | 1/2010 | Kinney et al. | |
| 2010/0131147 | A1 | 5/2010 | Donnelli | |
| 2010/0186866 | A1 | 7/2010 | Tomoi | |
| 2014/0253311 | A1 | 9/2014 | Yu | |
| 2015/0134197 | A1 | 5/2015 | Cahill | |
| 2015/0224831 | A1 | 8/2015 | Miller | |
| 2016/0272020 | A1 | 9/2016 | Bill | |
| 2017/0136834 | A1 | 5/2017 | Chong | |
| 2020/0031180 | A1 | 1/2020 | Usami | |
| 2021/0101423 | A1 | 4/2021 | Bill | |
| 2021/0166503 | A1 | 6/2021 | Shimomura | |
| 2022/0055423 | A1 | 2/2022 | Bill | |
| 2022/0080786 | A1 | 3/2022 | Iizuka | |
| 2022/0326703 | A1 | 10/2022 | Raje | |
| 2024/0369455 | A1 | 11/2024 | Sams | |

FOREIGN PATENT DOCUMENTS

| | | |
|---|---|---|
| GB | 2540414 | 1/2017 |
| GB | 2600457 | 5/2022 |
| GB | 2603147 | 8/2022 |
| WO | 2004037566 A1 | 5/2004 |
| WO | 2022129141 | 6/2022 |

OTHER PUBLICATIONS

Search Report for GB2207018.9, mailed Oct. 24, 2022, 4 pages.
Search Report for GB2207021.3, mailed Oct. 24, 2022, 4 pages.
Search Report for GB2207020.5, mailed Oct. 24, 2022, 4 pages.
Search Report for GB2207019.7, mailed Oct. 24, 2022, 4 pages.
U.S. Appl. No. 18/315,976, Notices of Allowance and Allowability (Reasons for Allowance) Oct. 7, 2025 (31 pages).
U.S. Appl. No. 18/316,774, Office Action (Oct. 28, 2025)(68 pages).
U.S. Appl. No. 18/315,976, Office Action, Feb. 6, 2026 (42 pages).

* cited by examiner

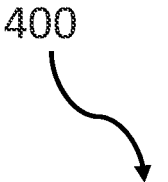

400

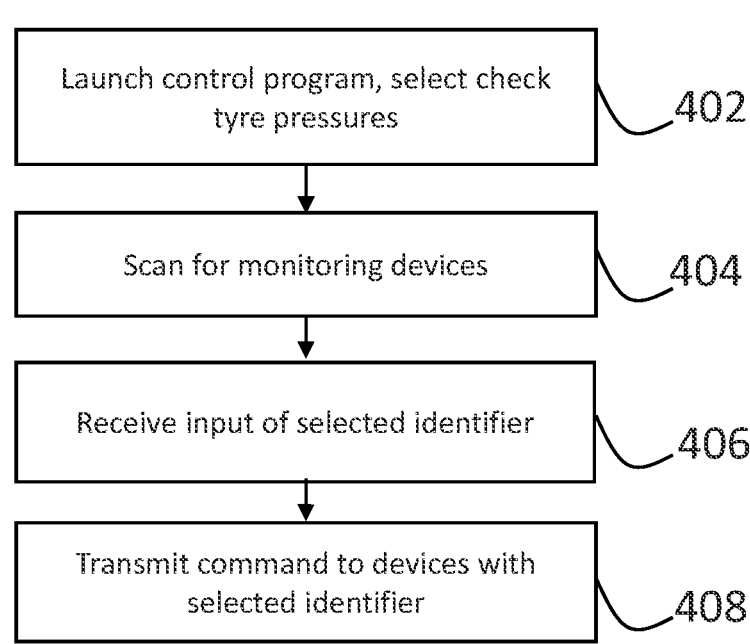

```
┌─────────────────────────────────┐
│ Launch control program, select check │  ⟍ 402
│         tyre pressures          │
└─────────────────────────────────┘
              │
              ▼
┌─────────────────────────────────┐
│    Scan for monitoring devices    │  ⟍ 404
└─────────────────────────────────┘
              │
              ▼
┌─────────────────────────────────┐
│   Receive input of selected identifier   │  ⟍ 406
└─────────────────────────────────┘
              │
              ▼
┌─────────────────────────────────┐
│   Transmit command to devices with   │  ⟍ 408
│        selected identifier        │
└─────────────────────────────────┘
```

Store performance coefficient in local memory — 802

Obtain plurality of values indicative of tire parameter — 804

Determine tire performance characteristic — 806

900

Determine that remote memory unavailable — 902

904 — Calculate performance coefficient at remote device

Obtain performance coefficient from local memory — 906

Obtain plurality of values indicative of tire parameter — 908

Determine tire performance characteristic — 910

1300

Query memory as to presence of first set of values — 1302

Determine first set of values are insufficient — 1304

1306 — Provide indication that second set of values is required

Determine tire performance characteristic

1308 — Retrieve performance coefficient from memory

Determine tire performance characteristic — 1310

METHOD OF DETERMINING A TIRE PERFORMANCE CHARACTERISTIC OF A TIRE

CROSS RELATED APPLICATION

The application incorporates by reference and claims priority to United Kingdom patent application GB 2207020.5, filed May 13, 2022.

TECHNICAL FIELD

The present invention relates to a method of determining a tire performance characteristic of a tire.

BACKGROUND

Checking tire pressure is an important part of the maintenance of a vehicle. Tire pressures should be maintained at predetermined pressures to ensure that a tire performs as intended by the manufacturer.

SUMMARY

A first aspect of the present invention provides a method of determining a tire performance characteristic of a tire, the method comprising: querying, using a processing system, a memory as to a presence of a first set of values indicative of a tire parameter of a tire in the memory; determining, using the processing system, that the first set of values is insufficient to determine the tire performance characteristic of the tire; and performing steps, using the processing system, comprising one or more of: providing an indication that a second set of values indicative of the tire parameter is required to determine the tire performance characteristic of the tire; and retrieving, from the memory, a performance coefficient of the tire corresponding to performance of the tire associated with the first set of values, and determining, based on the performance coefficient, the tire performance characteristic of the tire.

Where new tire monitoring devices are installed on existing wheels, there may be a gap in tire parameter data of a tire associated with the wheel that means such tire parameter data is insufficient to determine a tire performance characteristic of the tire. Such tire performance characteristics may require tire parameter data spanning at least a particular length of time, and/or containing at least a predetermined number of flight cycles or other operational events, to enable trend analysis from historical data. By providing an indication that the second set of values indicative of the tire parameter is required to determine the tire performance characteristic of the tire it may be indicated that the device is functioning correctly but more data is required to be collected to enable the tire performance characteristic to be determined. By retrieving a performance coefficient from memory, determination of the tire performance characteristic may be performed even where a gap in tire parameter data is present. It will be appreciated that these can be useful in isolation and in combination; in combination the indication might provide reason to treat the tire performance characteristic with caution, for example.

Optionally, the first set of values indicative of the tire parameter comprise historical measurements of the tire parameter, for example for a given wheel.

Optionally, a determination that the first set of values is insufficient to determine the tire performance characteristic of the tire is indicative of one or more of introduction of a new tire monitoring device associated with the tire, the tire comprising a new tire, and association of the tire with a new wheel.

Optionally, determining that the first set of values is insufficient to determine the tire performance characteristic of the tire comprises comparing a cardinality of the first set of values to a threshold, and determining that the cardinality is below the threshold.

Optionally, wherein determining that the first set of values is insufficient to determine a tire performance characteristic of the tire comprises determining that the first set of values is absent from the memory, and the method comprises providing an indication that a third set of values indicative of the tire parameter is required to determine a tire performance characteristic of the tire Optionally, determining that the first set of values is insufficient to determine the tire performance characteristic of the tire comprises determining that the first set of values comprise one or more missing values.

Optionally, determining that the first set of values is insufficient to determine the tire performance characteristic of the tire comprises determining that the first set of values is not indicative of stable points of the tire parameter.

Optionally, providing an indication that the second set of values is required to determine the tire performance characteristic comprises providing an indication to a user to perform one or more tire monitoring processes to obtain the second set of values indicative of the tire parameter.

Optionally, the method comprises obtaining the second set of values, and determining, based on the second set of values, the tire performance characteristic of the tire.

Optionally, the method comprises providing a notification to a user based on the tire performance characteristic.

Optionally, the notification comprises one or more of a visual notification to the user and an audible notification to the user. Optionally, the notification is provided to the user via one or more of a display device, a visual indicator, and an audio transducer.

Optionally, the user is remote from a vehicle for example an aircraft, to which the tire is mounted. Optionally the user comprises ground staff or maintenance personnel. Optionally the user is located on-board a vehicle, for example an aircraft, to which the tire is mounted. Optionally the user comprises a flight crew member.

Optionally, the method comprises determining, based on the tire performance characteristic, a maintenance action to be performed on the tire. Optionally, the method comprises causing display of the maintenance action to the user.

Optionally, the method comprises causing, based on the tire performance characteristic, the maintenance action to be performed on the tire. For example, the method may comprise one or more of scheduling the maintenance action to be performed on the tire and performing the maintenance action on the tire. The method may comprise automatically scheduling the maintenance action to be performed on the tire, for example without user input.

Optionally, the tire parameter comprises one or more of a tire pressure and a tire temperature.

Optionally, the tire performance characteristic comprises one or more of a rate of deflation of the tire, a predicted future inflation point of the tire, a pressure leakage rate of the tire, and a predicted time for the tire to cool to a predefined temperature.

Optionally, the tire comprises an aircraft tire.

A second aspect of the present invention provides a tire performance monitoring system comprising: a memory configured to store a first set of values indicative of a tire parameter of a tire; and a processing system configured to: query, the memory as to a presence of the first set of values; determine that the first set of values is insufficient to determine a tire performance characteristic of the tire; and perform steps comprising one or more of: providing an indication that a second set of values indicative of the tire parameter is required to determine the tire performance characteristic of the tire; and retrieving, from the memory, a performance coefficient of the tire corresponding to performance of the tire associated with the first set of values, and determining, based on the performance coefficient, the tire performance characteristic of the tire.

Optionally, the tire performance monitoring system comprises: a tire monitoring device configured to obtain a plurality of measured values of the tire parameter, the tire monitoring device comprising a local memory configured to store the plurality of measured values; and a remote device configured to retrieve the plurality of measured values from the local memory, and transmit, based on the plurality of measured values, the second set of values to the memory.

Optionally, the remote device is configured to provide, based on the indication that the second set of values indicative of the tire parameter is required to determine the tire performance characteristic of the tire, a notification to a user of the remote device that the second set of values is required.

Optionally, the processing system is located remotely from a vehicle comprising the tire.

Optionally, the processing system is configured to provide a notification to a user based on the tire performance characteristic.

Optionally, the processing system is configured to determine, based on the tire performance characteristic, a maintenance action to be performed on the tire.

Optional features of aspects of the present invention may be equally applied to other aspects of the present invention, where appropriate.

BRIEF DESCRIPTION OF THE DRAWINGS

Embodiments of the invention will now be described, by way of example only, with reference to the accompanying drawings, in which:

FIG. 4 shows a first method according to an example;

DETAILED DESCRIPTION

Figure 1:
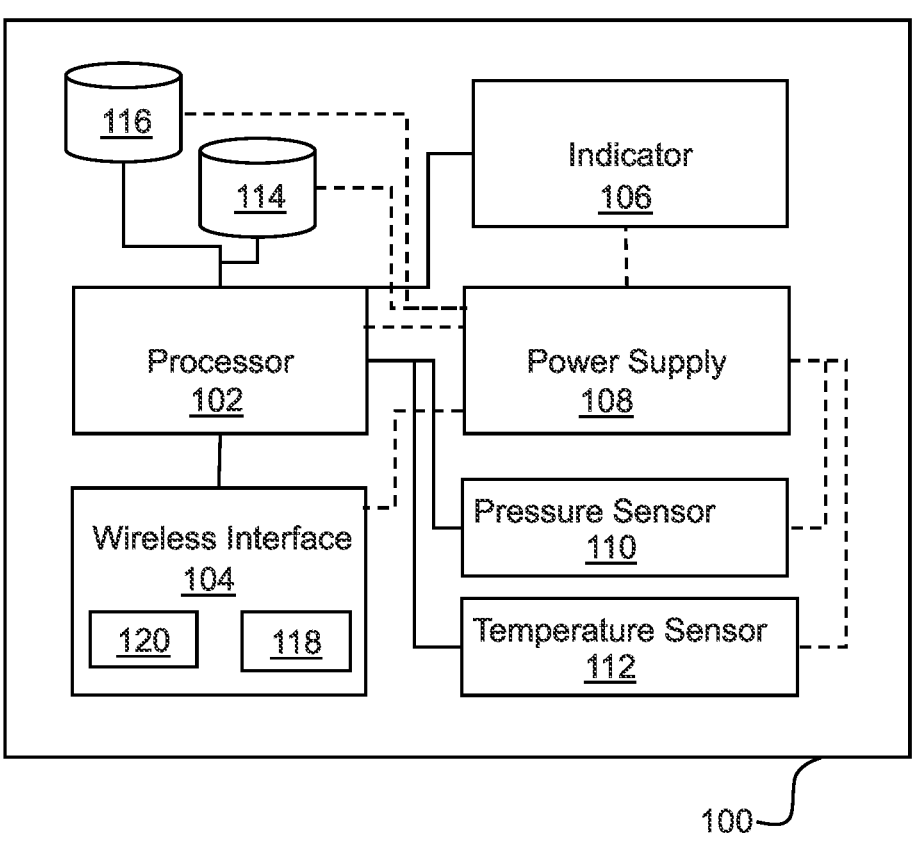
FIG. 1 shows a schematic view of an aircraft tire monitoring device.

An aircraft tire monitoring device 100 in accordance with the present invention is illustrated schematically in FIG. 1, in the form of a tire pressure monitoring device. The tire monitoring device 100 is configured for mounting on a wheel, for example by a mechanical connection to an opening on the wheel providing access to the tire. The tire monitoring device 100 includes a processor 102, a wireless communication interface 104, an indicator 106, a power supply 108, a pressure sensor 110, a temperature sensor 112, a first storage 114 and a second storage 116.

Processor 102 may be any suitable processing device including a microprocessor with one or more processing cores. In use, processor 102 coordinates and controls the other components and may be operative to read and/or write computer program instructions and data from/to the storage 114, 116. The processor 102 may be optimized for low power operation or have at least one processing core optimized for low power operation in some examples.

Wireless communication interface 104 is connected to the processor 102 and is used to both transmit and received data from the other devices of the tire pressure sensor system. In this example, the wireless communication interface 104 includes two transceivers, 118, 120 which both use different wireless technology. A first transceiver 118 is provided for relatively long-range communication, up to about 50 m or about 100 m. For example, the first transceiver 118 may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver 118 also includes an encryption module for encrypting sent data and decrypting received data, for example according to the Advanced Encryption Standard (AES) utilizing pre-shared keys. A second transceiver 120 is provided for relatively short-range communications. For example, the second transceiver 120 may use a standard according to IEEE 802.15, such as IEEE 802.15.4, RFID or Near Field Communication (NFC). The second transceiver 120 may operate over a range of less than 5 m, less than 3 m, less than 1 m, less than 50 cm, less than 25 cm, less than 10 cm, less than 5 cm, less than 1 cm or requiring contact between devices. Like the first transceiver 118, the second transceiver 120 also includes an encryption module for encrypting sent data and decrypting received data.

In some examples, a single wireless transceiver may be provided in the wireless communication interface 104. In that case the single transceiver may use relatively short range or relatively long range communication, or adjust the range (such as by controlling transmit power) as required.

Indicator 106 is connected to the processor 102 and controlled by the processor 102 to provide indications to a user of the tire monitoring device 100. In this example the indicator 106 is an LED, but in other examples the indicator is another form of light, a display, such as an LCD or e-ink display, or any other form of visual indication. In other examples, the indicator 106 is an audible indicator, such as a buzzer, beeper, speaker or any other sound generating component. In further examples, the indicator 106 can comprise both audible and visual indication components. The indicator 106 provides at least first and second indications, for example a first colour and a second colour of emitted light. Further indications can also be provided, such as solid or flashing light. The tire monitoring device 100 has a housing (not shown) and the indicator 106 can provide an indication outside the housing, for example the LED may be mounted external to the housing or visible through the housing, or sound may be able to be emitted from within the housing.

The power supply 108 provides power to the elements of the tire monitoring device 100. The power supply 108 may be a battery, such as Lithium battery. In this example, the power supply 108 is a Lithium battery with power sufficient to run the sensor in normal operation for about 2 to 3 years. In other examples the power supply 108 may comprise a power harvesting system, for example harvesting vibration and/or electromagnetic radiation to charge a capacitor or battery which is then used to power the device.

The pressure sensor 110 is connected to processor 102 and may be any suitable sensor for measuring pressure, for example a capacitive sensor. Similarly, the temperature sensor 112 is connected to processor 102 and may be any suitable sensor for measuring temperature, such as thermocouple. The temperature sensor 112 may be arranged to measure the temperature of the wheel or the temperature of the gas inside the tire directly. Where the temperature sensor 112 measures the temperature of the wheel, this can be processed to determine the temperature of the gas in the tire. For example, an algorithm or look-up table may be used.

The connection of the pressure sensor 110 and temperature sensor 112 to the processor 102 may be digital, providing a digital representation of the measured pressure and/or temperature from an Analogue to Digital Convertor (ADC) in the sensor itself, or analogue, in which case the processor may include an ADC to sample the received signal. Including both a pressure sensor 110 and a temperature sensor 112 may be useful to determine a temperature compensated pressure value. Although this example includes a pressure sensor 110 and a temperature sensor 112, other examples may include only a pressure sensor, or may include further sensors.

This example includes two storage elements 114 and 116, which can individually or collectively be referred to as local memory of the aircraft tire monitoring device 100. Storage 114 is non-volatile rewritable storage in this example, such as flash memory which can retain data without requiring applied power. Other examples may include volatile storage, which is kept powered by the power supply, or combinations of read-only and rewritable storage. Storage 114 is connected to the processor 102 and used to store both computer program instructions for execution by the processor and data, such as data from the pressure sensor 110 or received over the wireless communication interface 104. In some examples, storage 114 may store a history of pressure and/or temperature readings sensed by the pressure sensor 110 and the temperature sensor 112. For example, the previous ten days readings may be stored, with the newest data replacing the oldest once the storage is full.

Storage 116 is secure storage to which write and/or read access is restricted, for example only accessible to certain processes running on processor 102. Configuration data, such as wireless encryption keys can be stored in storage 116. In other examples, a single storage may be provided, or storage 114 and 116 may be provided in a single physical device with a logical partitioning between storage 114 and storage 116.

Figure 2:
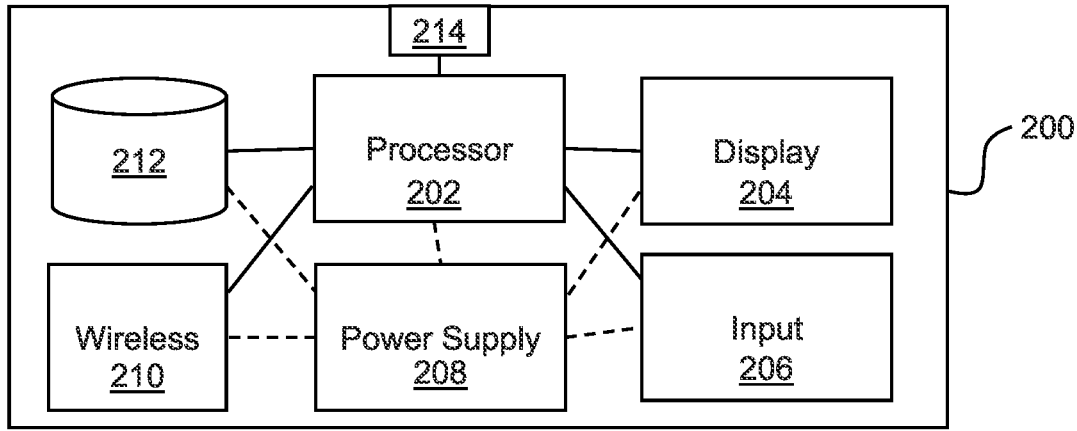
FIG. 2 shows a schematic view of a remote device.

FIG. 2 shows a schematic representation of a remote device 200 for use in conjunction with the tire monitoring device 100 of FIG. 1. The remote device 200 includes a processor 202, a display 204, an input system 206, a power supply 208, a wireless communication interface 210, a storage 212 and wired communication interface 214. In this example the remote device 200 is a mobile device, such as a cellular phone or a tablet computer.

The processor 202 is any suitable processing device, for example a multipurpose microprocessor, system-on-chip, or system in package, which may include one or more processing cores. Processor 202 is connected to the display 204, such an LCD, OLED or e-ink display to display information to a user of the remote device 200.

Input system 206 includes a touch screen interface in this example, allowing a user to interact with the remote device 200 by touching user interface elements on the screen. The input system 206 may include one or more buttons in addition to the touch screen, as well as other input devices, such as a microphone for speech recognition and a camera for image input. Other examples may not include a touch screen interface.

The remote device is powered by power supply 208, which is a rechargeable lithium-ion battery in this example. Other examples may use alternative power supplies, such as other battery technologies, mains power, or energy harvesting, such as solar power.

A wireless interface 210 is included for the remote device 200 to communicate with other devices, such as the tire monitoring device 100. In this example, a single wireless interface 210 is provided which is configured to communicate with the tire monitoring device 100. For example, a relatively long range wireless communication technology can be used, such as one conforming to IEEE 802.15.1, IEEE 802.15.4 or IEEE 802.11. This allows the remote device 200 to interact with the tire monitoring device 100 from a relatively long range.

In other examples, the remote device 200 may be provided with multiple wireless communication interfaces or transceivers, operating with different wireless technologies, such as at least two of IEEE 802.15.1, IEEE 802.15.4, IEEE 802.11 (Wi-Fi), WAIC, RFID and NFC. For example, the remote device 200 may have two transceivers with one having a longer communication range than the other.

Storage 212 includes a non-volatile element, such as flash memory, and a volatile element, such as RAM. The non-volatile element is used to store operating system software and application software. In this example, the remote device 200 runs standard operating system software and is loaded with application software to interact with the tire monitoring device 100. In order to restrict access to the tire monitoring device 100, the application software may be provided from a secure source and not available to the general public, and/or require credentials to be entered before operating.

Wired communication interface 214 is provided for connection to a computing system. The wired communication interface 214 can be for example, a serial data connection, such as Universal Serial Bus (USB), a parallel data connection or a network connection, such as Ethernet. The wired communication interface 214 may allow the remote device 200 to communicate values and/or other status information read from the tire monitoring device 100 to a computing system, for example to store long term trends and assist fleet management. Alternatively, or additionally, wired communication interface 214 may be used for communication with the computing system. In some examples, the remote device 200 may not include a wireless communication interface.

Figure 3:
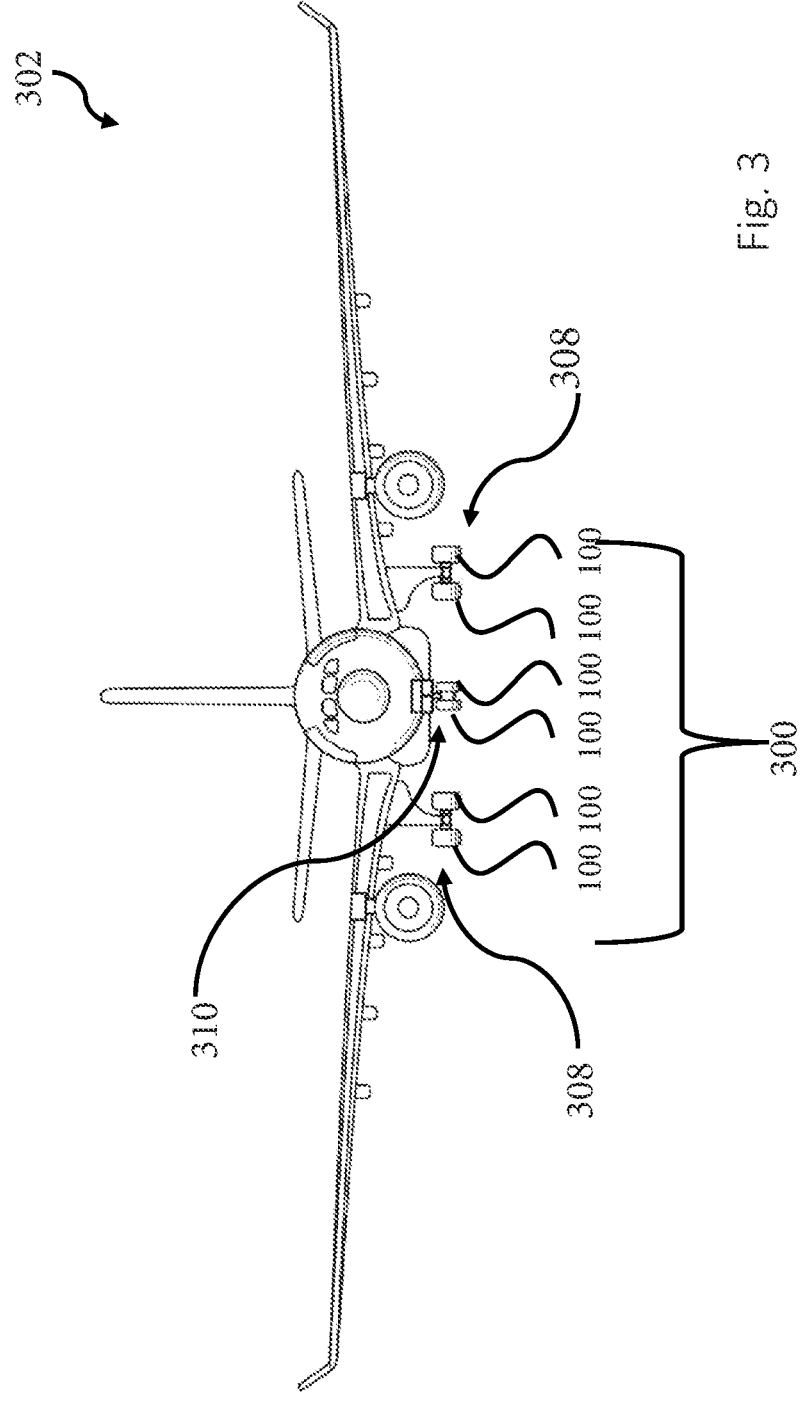
FIG. 3 shows a schematic view of an aircraft.

FIG. 3 shows a schematic representation of a tire pressure sensor network 300 comprising a plurality of tire monitoring devices 100 installed in an aircraft 302. The aircraft 302 comprises main landing gear 308 and nose landing gear 310. The aircraft 302 may be used in conjunction with any of the methods described herein. Tire monitoring devices 100 are installed on each wheel of the main landing gear 308 and nose landing gear 310.

In an example, the tire monitoring devices 100 are also in communication with a cockpit system to provide tire pressure information to the pilots on the flight deck. In these examples, the flight deck console may also function as a remote device.

FIG. 4 shows a flow chart of a tire pressure check process 400 that can be used with the tire pressure sensor network 300 of FIG. 3. First, at block 402, a user launches the tire monitoring control application on the remote device 12. During initialization of the application, a check is made that the wireless communication interface 210 for communication with the tire monitoring devices 100 is active on the remote device 200 and the user is prompted to activate if it is not active.

Next, at block 404, the remote device 200 scans for tire monitoring devices 100 in range. For example, the remote device 200 may send out a probe over the wireless communication interface 210. At the same time, the tire monitoring devices 100 are periodically waking and listening for the probe of the remote device, and/or periodically waking and broadcasting respective identification signals, which include aircraft identifiers, such as a tail identifier of an aircraft to which the tire monitoring device 100 is attached.

The scanning may comprise establishing direct, point-to-point contact with each tire monitoring device 100, or contact through the network 300 of tire monitoring devices 100, for example through an access point, a master device, or any device in a mesh network.

Depending on the communication range and location, tire monitoring devices associated with more than one aircraft may be detected. For example, several aircraft may be in the same hanger in range of the remote device 200. At block 406, input is received of a selected identifier.

Next, at block 408, a request or command is sent to the tire monitoring devices 100 corresponding to the selected identifier to cause them to connect to the remote device 200, for example so that they can receive a request from the remote device 200 to carry out a tire pressure check.

Throughout the process 400 of FIG. 4, communication between the remote device 200 and the tire monitoring devices 100 may be secure, for example encrypted by a network key. The network key for the communication with the remote device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. This alone may be sufficient to provide increased security because physical proximity is required to intercept communications. In some examples, security may be increased by reducing transmission power when encryption keys are transmitted compared to transmission of the encrypted data itself, requiring closer proximity for the initial key exchange process.

Figure 5:
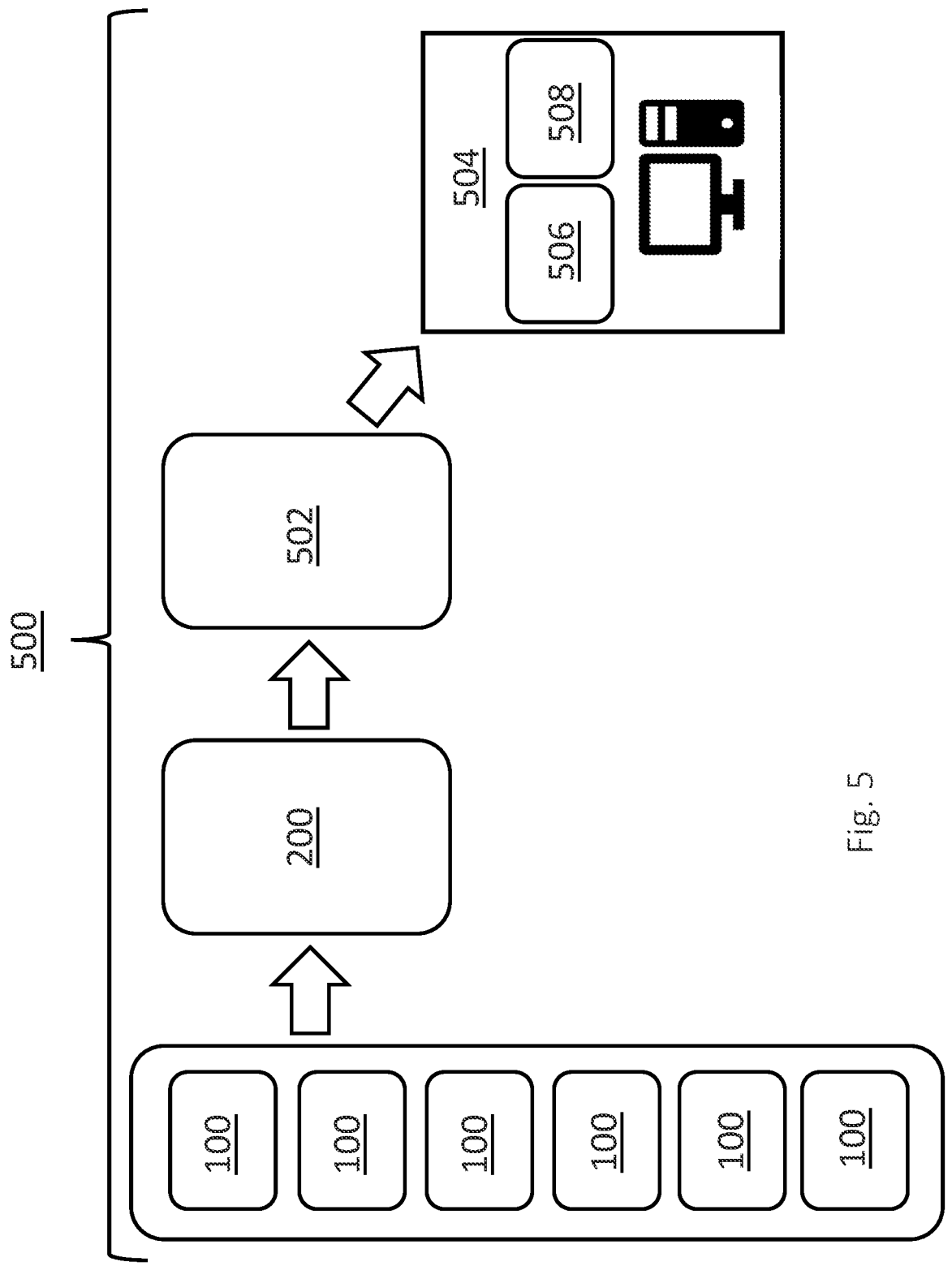
FIG. 5 shows a first schematic view of a tire performance monitoring system.

A tire performance monitoring system 500 that utilises the tire pressure sensor network 300 is illustrated schematically in FIG. 5, and comprises the tire pressure sensor network 300 formed of the plurality of tire monitoring devices 100, the remote device 200, a remote memory 502, and a remote computing device 504.

The remote memory 502 is disposed remotely from the tire pressure sensor network 300, and hence the plurality of aircraft tire monitoring devices 100, and the remote device 200, and comprises any memory device capable of storing data associated with the tire pressure sensor network 300. In some examples the remote memory 502 can comprise a database or the like, for example hosted on a server remote from the tire pressure sensor network 300, and hence the plurality of aircraft tire monitoring devices 100, and the remote device 200. Although illustrated separately in FIG. 5, it will be appreciated that in some examples the remote memory 502 can comprise part of the remote computing device 504. Similarly, whilst one memory is illustrated, it will be appreciated that in practice the memory may comprise multiple memory devices, for example distributed across physical and/or virtual locations.

The remote computing device 504 is disposed remotely from the tire pressure sensor network 300, and hence the plurality of aircraft tire monitoring devices 100, and the remote device 200. The remote computing device 504 comprises a processor 506 and a display device 508. The processor 506 can be thought of as part of a processing system herein. In certain examples, any or any combination of an aircraft tire monitoring device 100, the remote device 200, and the remote computing device 504 can be considered to form part of a processing system as discussed herein. Whilst illustrated as a single processor 506, the remote computing device 504 may comprise more than one processor in practice, and similarly the system can additionally or alternatively comprise a plurality of remote computing devices 504 such as a server farm. The display device 508 can comprise a screen capable of displaying a graphical user interface to a user of the remote computing device 504.

The tire performance monitoring system 500 can be utilised to process and/or analyse data obtained from the tire pressure sensor network 300 to provide further detail about aircraft tire performance characteristics of the tires of the aircraft 302.

In particular, each of the aircraft tire monitoring devices 100 is configured to wake-up every 10 minutes to measure pressure and temperature values using the respective pressure sensor 110 and temperature sensor 112. It will be appreciated that 10 minutes is used herein as an exemplary value, and that other wake-up frequencies are also envisaged. Such measured pressure and temperature values are stored in the respective first storage 114 of the aircraft tire monitoring device 100, i.e., in local memory of the aircraft tire monitoring device 100. When a tire pressure check is performed, for example once the aircraft tire monitoring devices 100 are connected to the remote device 200 following an appropriate request or command 408 in accordance with the method 400 described above, the remote device 200 obtains the measured pressure and temperature values from the first storage 114 of the respective aircraft tire monitoring devices 100.

The remote device 200 sends the measured pressure and temperature values, or appropriate values derived from the measured pressure and temperature values, to be stored in the remote memory 502. Such stored values are retrieved by the remote computing device 504, and are processed, by the processor 506 of the remote computing device 504, to determine tire performance characteristics of the tire. Examples of tire performance characteristics include a rate of deflation of the tire, a predicted future inflation point of the tire (also referred to a predicted future time when the tire will require inflation), a pressure leakage rate of the tire, and a predicted time for the tire to cool to a predefined temperature. Such tire performance characteristics of the tire can be utilised by a user of the tire performance monitoring system 500 to inform maintenance procedures associated with the tires of the aircraft 302.

Performance Coefficients

In the tire pressure sensor network 300 for the aircraft 302 there are six aircraft tire monitoring devices 100, although the number of aircraft tire monitoring devices 100 for an aircraft 302 may vary, for example dependent on the number of wheels of the aircraft 302. With each tire monitoring device 100 waking every 10 minutes to measure pressure and temperature values, and an aircraft operator typically having a number of aircraft in a fleet, in practice a large number of values are stored in the remote memory 502. For example, a single aircraft will generate 864 sets of pressure and temperature values a day, or 6,408 a week. For a fleet of thirty aircraft, this is 25,920 sets of pressure and temperature values a day, or 192,240 a week. In addition to large storage space requirements, this may cause latency in both retrieval of stored values from the remote memory 502 by the remote computing device 504, and in processing of the retrieved values by the remote computing device 504. This can lead to latency in determination of maintenance procedures associated with the tires of the aircraft 302.

Figure 6:
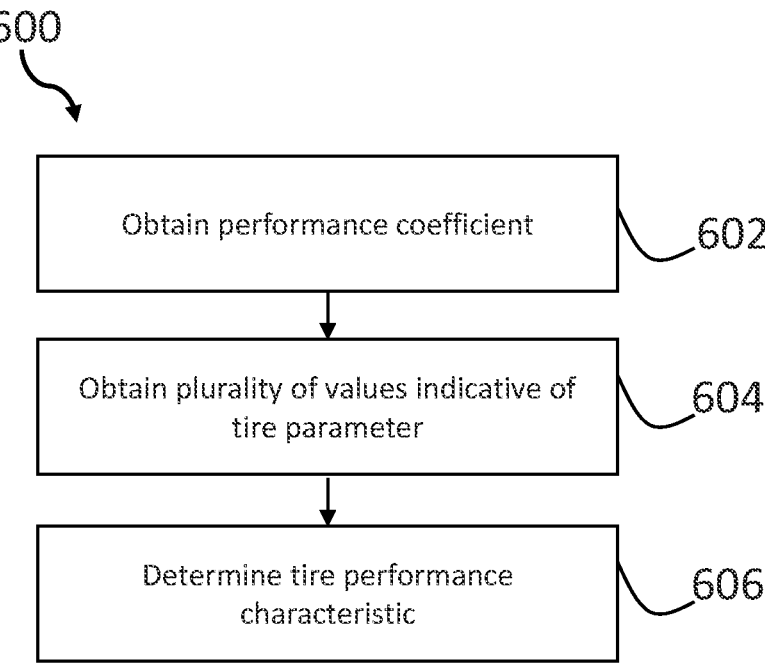
FIG. 6 shows a second method according to an example.

A method 600 in accordance with the present disclosure, and which may mitigate for such latency, is illustrated in the flow diagram of FIG. 6. The method 600 comprises obtaining 602, using the remote computing device 504, a performance coefficient of a tire corresponding to performance of the tire during a first time period, wherein the performance coefficient is based on a first plurality of values indicative of a tire parameter over the first time period. The method 600 comprises obtaining 604 a second plurality of values indicative of the tire parameter over a second time period. The method 600 comprises determining 606, based on the second plurality of values and the performance coefficient, the tire performance characteristic.

By determining the tire performance characteristic based on the performance coefficient, determination of the tire performance characteristic may be simplified compared to, for example, a method where the first plurality of values is directly used to determine the tire performance characteristic. Such simplification may result in a reduced time to determine the tire performance characteristic, which may reduce latency in providing results to a user. This may be beneficial where, for example, a maintenance action of relatively high importance is determined based on the tire performance characteristic. The method may find utility where the performance coefficient is stored in the remote memory 502 and retrieved from the remote memory 502 to determine the tire performance characteristic. For example, the method may comprise storing the performance coefficient in the remote memory 502, and retrieving the performance coefficient from the remote memory 502 to determine the tire performance characteristic. This may provide reduced latency compared to, for example, a method where the first plurality of values need to be retrieved from the remote memory 502 to determine the tire performance characteristic.

In some examples the performance coefficient can comprise a rate of deflation of the tire during the first time period.

Figure 7:
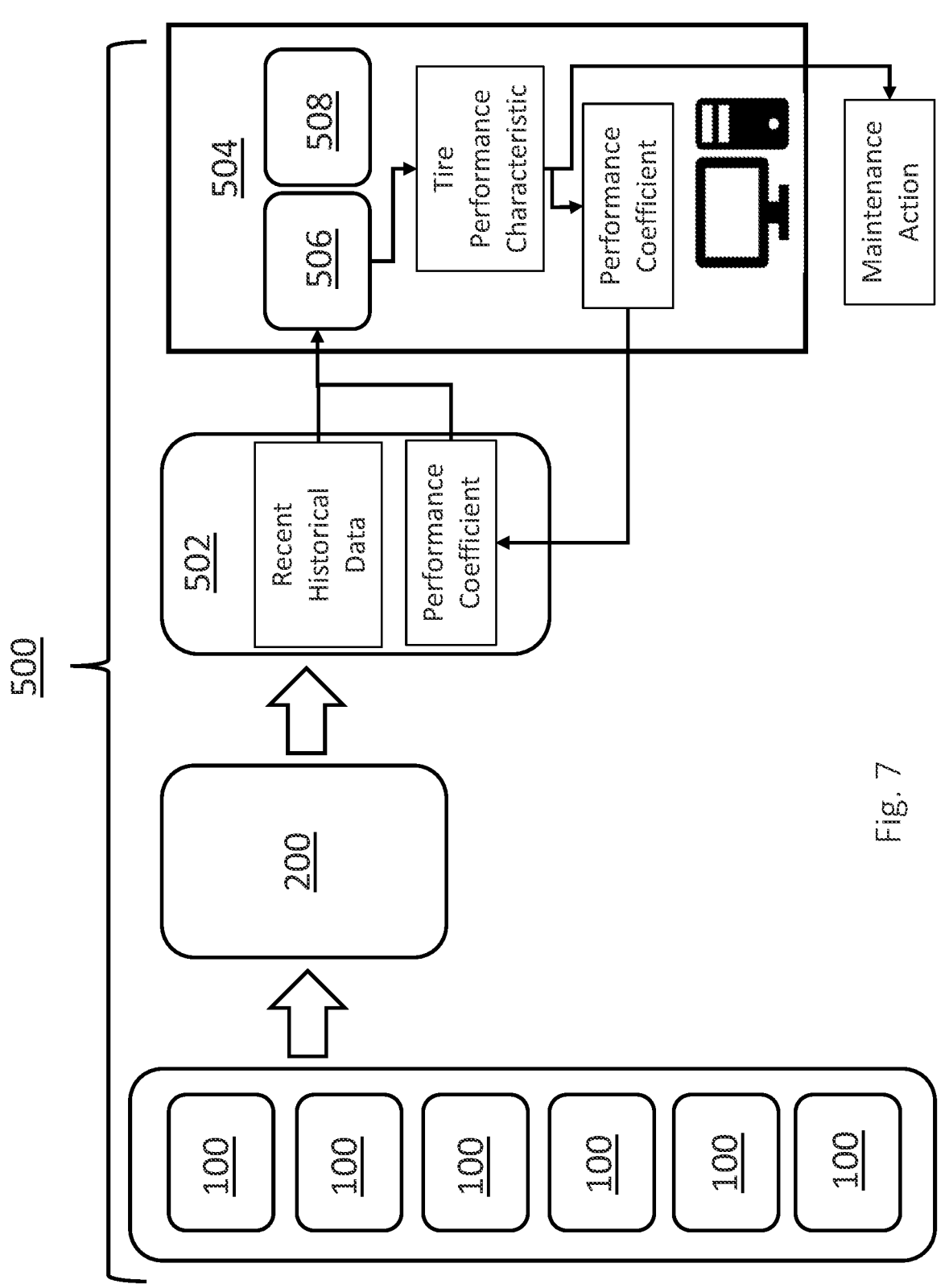
FIG. 7 shows a second schematic view of a tire performance monitoring system.

The method 600 is further illustrated with reference to the schematic illustration of the tire performance monitoring system 500 of FIG. 7, where like reference numerals to those of FIG. 5 are used for sake of clarity. Here an aircraft tire monitoring device 100 is configured to wake every 10 minutes and take pressure and temperature readings using its respective pressure sensor 110 and temperature sensor 112, with the measured values being stored in the storage element 114 of the aircraft tire monitoring device 100. The remote device 200 is used by an operator to periodically perform tire pressure checks using the aircraft tire monitoring device 100. For example, the remote device 200 can request that the aircraft tire monitoring device 100 informs the remote device 200 of its current pressure value, along with a determined status, such as whether the pressure is within acceptable limits or further action is required.

As part of such a tire pressure check, the remote device 200 downloads the measured pressure and temperature values and transmits the measured pressure and temperate values, or values based on the measured pressure and temperature values, for storage in the remote memory 502, alongside a corresponding wheel and/or aircraft tail identifier. For example, all the measured pressure and temperature values since the last download may be provided to the remote device 200. In some embodiments, the aircraft tire monitoring device 100 may store data of when the last download occurred to allow it to select the appropriate values. In other examples, the remote device may include a request initial time or start time after which measurements are downloaded. In further examples, the aircraft tire monitoring device 100 may delete values or otherwise mark them as downloaded after transmitting them to the remote device 200. Other examples are possible.

The remote computing device 504 can query the remote memory 502 regarding the values stored therein. When a sufficient number of values for a given wheel have been obtained, for example values over a period of around 30 days, the remote computing device 504 obtains the pressure and temperature values for the wheel from the remote memory 502, and using those values determines, using the processor 506, a performance coefficient for the wheel. Such a performance coefficient is indicative of at least the pressure characteristics of the tire associated with the wheel over the 30 day period, and in some examples can also be based on a tire performance characteristic determined by the remote computing device 504 using the plurality of values from the 30 day period.

The determined performance coefficient is then stored in the remote memory 502 for future use, possibly along with data indicating the real time period of the data from which it was calculated, such as the time period in Coordinated Universal Time (UTC), and along with data identifying the aircraft and/or wheel for which the performance coefficient has been calculated such as an aircraft tail ID and/or an aircraft wheel identifier. When subsequent values indicative of pressure and temperature of the tire associated with the given wheel are obtained by the aircraft tire monitoring device 100, these subsequent values are downloaded and transmitted by the remote device 200, in a similar manner to that described above, to the remote memory 502. When it is desired to determine a tire performance characteristic, the remote computing device 504 obtains the subsequent values and the performance coefficient for the given aircraft 302 from the remote memory 502, and the processor 506 uses the subsequent values and the performance coefficient to determine the tire performance characteristic. Use of the performance coefficient enables the tire performance characteristic to be determined using a smaller set of values than would otherwise be needed, and in some examples the subsequent values may be obtained over no more than 5 days, or no more than 3 days. As a smaller set of values are required, latency in obtaining the values and the performance coefficient from the remote memory 502 may be reduced compared to an embodiment where the performance coefficient is not used, and similarly latency in determining the tire performance characteristic using the remote computing device 504 may be reduced.

It will be appreciated that the tire performance characteristic can take many forms in practice, depending on what characteristic is deemed useful for or by an operator of the aircraft 302. Exemplary tire performance characteristics include one or more of a rate of deflation of a tire, a predicted future inflation point of a tire, a pressure leakage rate of a tire, and a predicted time for a tire to cool to a predefined temperature.

With knowledge of such tire performance characteristics, appropriate maintenance actions for the aircraft 302 and in particular the tires of the aircraft 302, can be determined. In some examples the remote computing device 504 can provide an indication, or cause an indication to be provided, based on the tire performance characteristic. For example, the remote computing device 504 can provide a notification to a user via the display device 508, or cause provision of a visual notification or an audible notification based on the tire performance characteristic. Such a visual notification can take the form of a message displayed on the display device 508 of the remote computing device 504. The notification can simply communicate the tire performance characteristic to a user, or in some examples the remote computing device 504 can determine a maintenance action to be performed based on the tire performance characteristic, and then communicate the determined maintenance action to the user via the notification. In some examples, the remote device 200 can additionally or alternatively provide a notification to an operator in a similar manner to that described above, for example with the remote device 200 receiving data from the remote computing device 504 over a network and acting accordingly.

In some examples, as well as determining the maintenance action to be performed based on the tire performance characteristic, the remote computing device 504 can cause the maintenance action to be performed, for example by scheduling performance of the determined maintenance action based on the determined tire performance characteristic. Maintenance personnel can then take appropriate steps to perform the desired maintenance action.

Over time, changes in the measured pressure and temperature values may lead to the performance coefficient becoming outdated, for example following a tire change. The remote computing device 504 may therefore update the performance coefficient, with an updated performance coefficient replacing the previously stored performance coefficient in the remote memory 502. The updated performance coefficient is typically based on at least one of the existing performance coefficient, subsequently obtained values from the aircraft tire monitoring device 100, and the tire performance characteristic. The performance coefficient can be updated each time a new value is determined for the tire performance characteristic, or can be updated at regular intervals, for example each third or fifth time a new value is determined for the tire performance characteristic. Updating the performance coefficient in the manner described above may ensure accuracy of the determined tire performance characteristic. Other examples may retain previous values of the tire performance characteristic as well as the updated value, this can be useful for auditing the data and may allow further analysis based on a trend in the tire performance characteristic itself.

Memory Availability

Whilst the tire performance monitoring system 500 discussed above can facilitate determination of the tire performance characteristic, there are certain scenarios in which the remote memory 502 may be unavailable. For example, there may be certain scenarios in which connection to the remote memory 502 over a network is unavailable for one or more of an aircraft tire monitoring device 100, the remote device 200, and the remote computing device 504.

Figure 8:
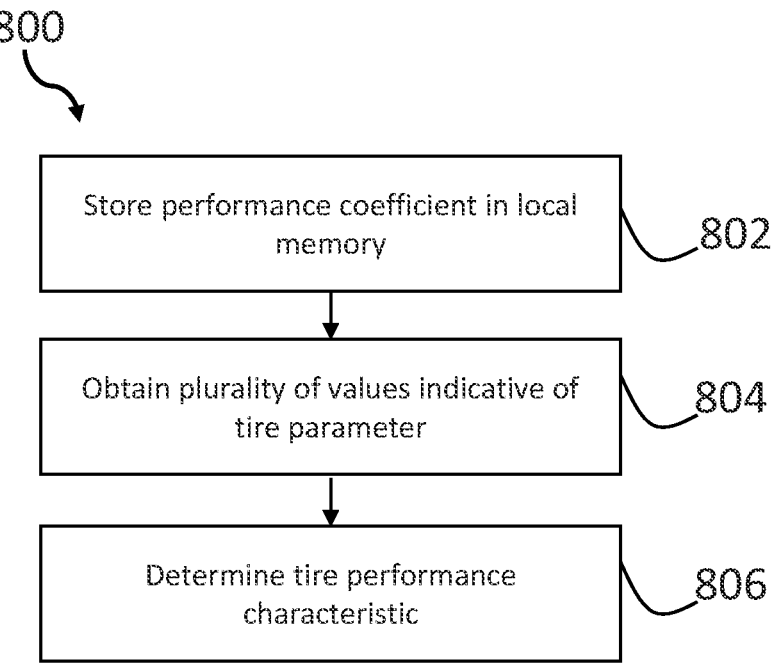
FIG. 8 shows a third method according to an example.

A first method 800 that may facilitate calculation of the tire performance characteristic in scenarios such as those described above is illustrated in the flow diagram of FIG. 8. The method 800 comprises storing 802, in a local memory of a tire monitoring device, a performance coefficient corresponding to performance of the tire. The method 800 comprises obtaining 804 a plurality of values indicative of a tire parameter of a tire over a time period. The method 800 comprises determining 806, using a processing system, and based on the plurality of values and the performance coefficient, the tire performance characteristic.

By storing the performance coefficient in the local memory of the tire monitoring device, the tire performance characteristic may be determined where, for example, connection to a remote memory or remote processing system, for example a remote database, is not possible.

Figure 9:
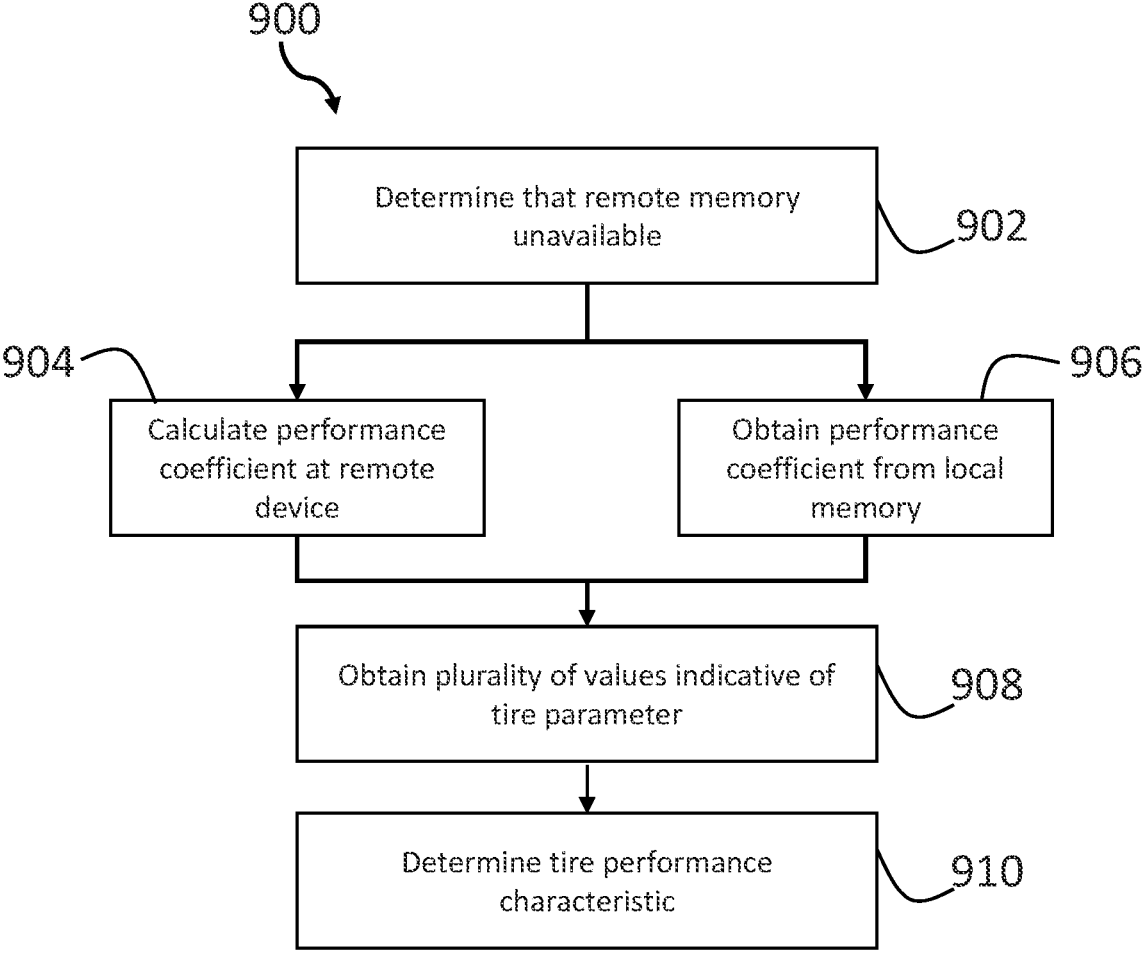
FIG. 9 shows a fourth method according to an example.

A second method 900 that may facilitate calculation of the tire performance characteristic in scenarios such as those described above is illustrated in the flow diagram of FIG. 9. The method 900 comprises determining 902 that a remote memory, remote from a tire monitoring device associated with a tire, is unavailable, the remote memory configured to store a performance coefficient of the tire corresponding to performance of the tire during a first time period. Where the remote memory is unavailable, the method 900 comprises either calculating 904 the performance coefficient at a remote device or, obtaining 906, using the remote device, the performance coefficient from a local memory of the tire monitoring device. In some examples, calculating 904 of the performance coefficient may be conditional on data of the performance coefficient stored in local memory. For example, the calculating 904 may occur if there is no performance coefficient in local memory. The calculating 904 may also occur if the performance coefficient in local memory is too old (such as exceeding a threshold age).

The method 900 comprises obtaining 908, using the remote device and from the tire monitoring device, a plurality of values indicative of a tire parameter of the tire during a second time period. The method 900 comprises determining 910, at the remote device and based on the plurality of values and the performance coefficient, a performance characteristic.

By obtaining the performance coefficient from the local memory of the tire monitoring device, or calculating the performance coefficient at the remote device, the tire performance characteristic may be determined where, for example, connection to a remote memory or remote processing system, for example a remote database, is not possible.

The methods 800 and 900 are described in further detail below, with reference to the schematic illustrations of FIGS. 10, 11, and 12, where like reference numerals to those of FIG. 5 are used for sake of clarity.

Figure 10:
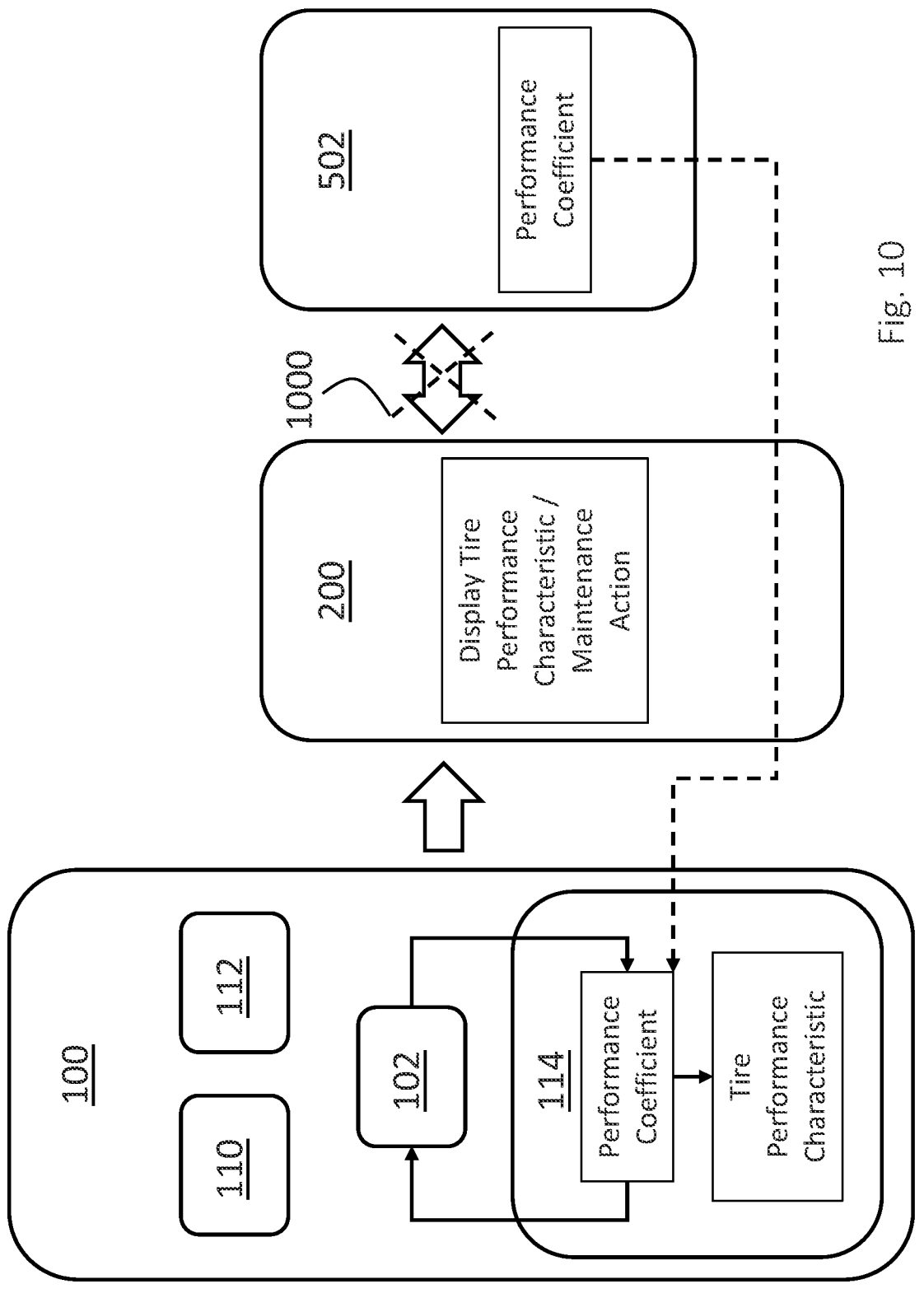
FIG. 10 shows a third schematic view of a tire performance monitoring system.

In the example of FIG. 10, a single aircraft tire monitoring device 100 is shown alongside a remote device 200. The aircraft tire monitoring device 100 is configured to wake every 10 minutes and take pressure and temperature readings using its respective pressure sensor 110 and temperature sensor 112, with the measured values being stored in the storage element 114 of the aircraft tire monitoring device 100. The processor 102 of the aircraft tire monitoring device can utilise the values stored in the storage element 114 to determine a performance coefficient, such as those performance coefficients previously discussed, with the performance coefficient subsequently stored in the storage element 114.

The performance coefficient stored in the storage element 114 can be used by the processor 102, alongside subsequently measured pressure and temperature values, to determine a tire performance characteristic in the manner previously described. The tire performance characteristic can be then stored in the storage element 114. The remote device 200 is used by an operator to periodically perform tire pressure checks using the aircraft tire monitoring device 100, in the manner previously described. The remote device 200 can be used to download data, including the tire performance characteristic, from the aircraft tire monitoring device, with the remote device 200 displaying the tire performance characteristic and/or a proposed maintenance action based on the tire performance characteristic, similar to the manner previously described.

As described above in relation to the remote device 200 obtaining the tire performance characteristic from the storage element 114, in some examples the remote device can request the tire performance characteristic in real-time, for example as part of a tire pressure check, or concurrently/ simultaneously with a tire processor check. Here the processor 102 can determine the tire performance characteristic in real-time using the stored performance coefficient and recently obtained pressure and temperature measurements, with the tire performance characteristic transmitted to the remote device 200 once determined. Use of the performance coefficient stored in the storage element 114 may reduce a time taken to perform the tire pressure check compared to an embodiment where no performance coefficient is present, which can lead to reduced aircraft turn-around times, for example. Use of the performance coefficient may also enable determining the tire performance characteristic with reduced processing resource and/or power requirements.

In some examples the process described in relation to FIG. 10 may take place when connection of at least one of the aircraft tire monitoring device 100 and the remote device 200 to the remote memory 502 is unavailable, for example as a result of failure of a network connection to the remote memory 502. Unavailability of the remote memory 502 is illustrated schematically by a dashed cross 1000 in FIG. 10. In such examples the performance coefficient may not necessarily be determined initially at the aircraft tire monitoring device 100, and may instead be determined at the remote computing device 504 in a manner similar to that previously described. The performance coefficient may then be stored in both the remote memory 502 and in the storage element 114 of the aircraft tire monitoring device 100, such that the performance coefficient in the remote memory 502 can be used by the remote computing device 504 to determine the tire performance characteristic where the remote memory 502 is accessible, and the performance coefficient in the storage element 114 can be used by the processor 102 of the aircraft tire monitoring device 100 where the remote memory 502 is inaccessible. In some examples, the performance coefficient can be transmitted for storage in the storage element 114 via initial transmission from the remote memory 502 to the remote device 200, and subsequent transmission from the remote device 200 to the aircraft tire monitoring device 100. Only the performance coefficient with the correct identifiers, e.g., the correct aircraft and/or wheel identifiers, is transmitted from the remote memory 502 for storage in the storage element 114 of the aircraft tire monitoring device.

Figure 11:
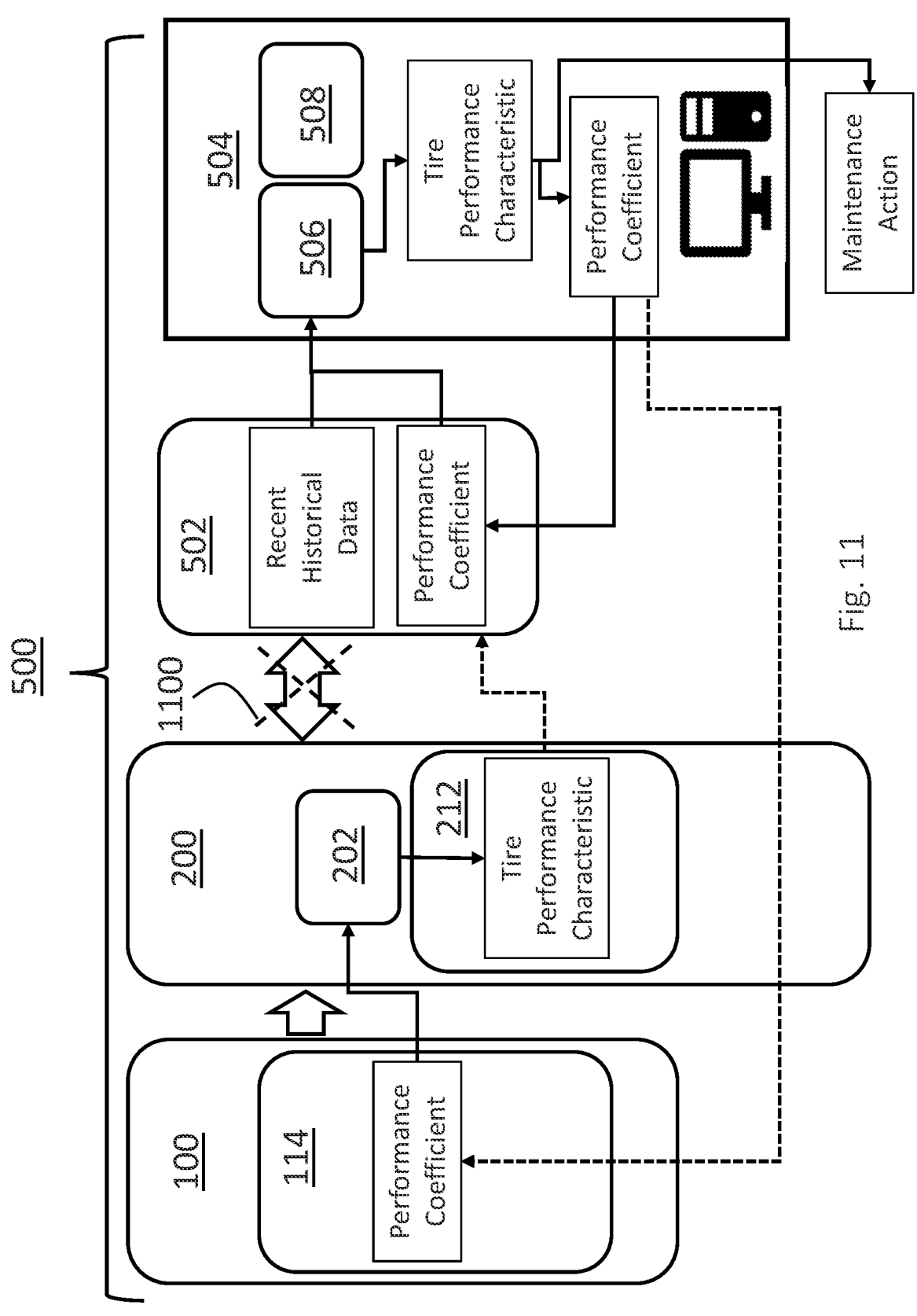
FIG. 11 shows a fourth schematic view of a tire performance monitoring system.

In the example of FIG. 11, instead of the processor 102 of the aircraft tire monitoring device 100 determining the tire performance characteristic, the remote device 200 determines the tire performance characteristic, for example using its processor 202. Here the tire performance monitoring system 500 again comprises an aircraft tire monitoring device 100, the remote device 200, a remote memory 502, and a remote computing device 504.

As before, the aircraft tire monitoring device 100 is configured to wake-up every 10 minutes to measure pressure and temperature values using the respective pressure sensor 110 and temperature sensor 112. Such measured pressure and temperature values are stored in the respective first storage 114 of the aircraft tire monitoring device 100, i.e., in local memory of the aircraft tire monitoring device 100. When a tire pressure check is performed, for example once the aircraft tire monitoring devices 100 are connected to the remote device 200 following an appropriate request or command 408 in accordance with the method 400 described above, the remote device 200 downloads the measured pressure and temperature values from the aircraft tire monitoring device 100 and transmits the measured pressure and temperate values, or values based on the measured pressure and temperature values, for storage in the remote memory 502, alongside a corresponding wheel and/or aircraft tail identifier. The remote computing device 504 can query the remote memory 502 regarding the values stored therein. When a sufficient number of values for a given wheel have been obtained, for example values over a period of around 30 days, have been obtained, the remote computing device 504 obtains the pressure and temperature values for the wheel from the remote memory 502, and using those values determines, using the processor 506, a performance coefficient for the wheel. Such a performance coefficient is indicative of at least the pressure characteristics of the tire associated with the wheel over the 30 day period, and in some examples can also be based on a tire performance characteristic determined by the remote computing device 504 using the plurality of values from the 30 day period.

The determined performance coefficient is then stored in the remote memory 502 for future use, as well as being stored in the storage element 114 of the aircraft tire monitoring device 100. When subsequent values indicative of pressure and temperature of the tire associated with the given wheel are obtained by the aircraft tire monitoring device 100, and a tire pressure check is desired to be performed, these subsequent values are downloaded and transmitted by the remote device 200, in a similar manner to that described above, to the remote memory 502 where the remote memory 502 is accessible. When it is desired to determine a tire performance characteristic, and the remote memory 502 is accessible over a network connection, the remote computing device 504 obtains the subsequent values and the performance coefficient for the given aircraft 302 from the remote memory 502, and uses the subsequent values and the performance coefficient to determine, via its processor 506, the tire performance characteristic. Notifications of the tire performance characteristic and/or maintenance actions can then be provided to a user of the remote computing device 504 using the display device 508.

Where, instead, it is determined, for example by the remote device 200, that the remote memory 502 is inaccessible over a network connection, the remote device 200 obtains the performance coefficient from the storage element 114 of the aircraft tire monitoring device 100, alongside the subsequent measured values of pressure and temperature. Inaccessibility of the remote memory 502 is illustrated schematically by a dashed cross 1100 in FIG. 11. The remote device 200 is then used to determine, via its processor 202, the tire performance characteristic using the performance coefficient from the storage element 114 of the aircraft tire monitoring device 100, alongside the subsequent measured values of pressure and temperature. In some examples an application running on the remote device can determine the tire performance characteristic. The remote device 200 can notify an operator of the remote device of the determined tire performance characteristic, and/or a maintenance action associated with the determined tire performance characteristic.

Additionally or alternatively, the remote device 200 can store, in storage 212 any of the subsequent measured values of pressure and temperature and the determined tire performance characteristic. The remote device 200 can then, when the remote memory 502 is accessible over a network connection, transmit the subsequent measured values of pressure and temperature and/or the determined tire performance characteristic for storage in the remote memory 502.

In some examples, when determining the tire performance characteristic, the remote device 200 can also determine an updated performance coefficient, and transmit the updated performance coefficient to be stored in the storage element 114 of the aircraft tire monitoring device 100. Such an updated performance coefficient can also be stored in the storage 212 of the remote device and transmitted, when the remote memory 502 is accessible over a network connection, for storage in the remote memory 502.

Figure 12:
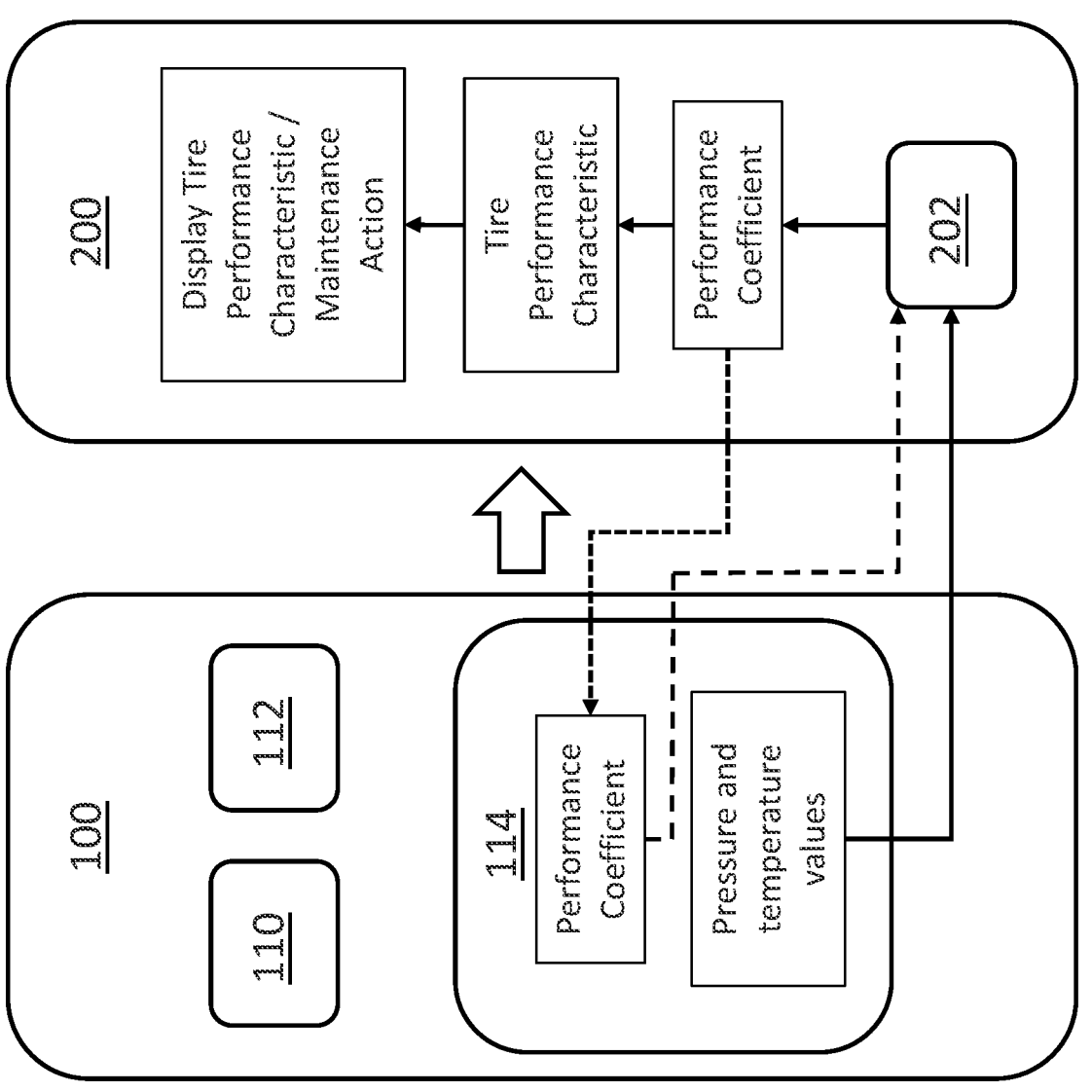
FIG. 12 shows a fifth schematic view of a tire performance monitoring system.

In the example of FIG. 12, the remote device 200 again determines the tire performance characteristic using its processor 202. However, in the example of FIG. 12 the remote memory 502 and the remote computing device 504 do not form part of the tire performance monitoring system 500. In such a scenario, the remote memory 502 can be considered as inaccessible to the remote device 200.

As before, the aircraft tire monitoring device 100 is configured to wake-up every 10 minutes to measure pressure and temperature values using the respective pressure sensor 110 and temperature sensor 112. Such measured pressure and temperature values are stored in the respective first storage 114 of the aircraft tire monitoring device 100, i.e., in local memory of the aircraft tire monitoring device 100. When a tire pressure check is performed, for example once the aircraft tire monitoring devices 100 are connected to the remote device 200 following an appropriate request or command 408 in accordance with the method 400 described above, the remote device 200 downloads the measured pressure and temperature values. Provided a sufficient number of values for a given wheel have been obtained, for example values over a period of around 30 days, have been obtained, the remote device 200 determines, using its processor 202, the performance coefficient using the obtained values. The remote device 200 can then utilise the determined performance coefficient to determine a tire performance characteristic in the manner previously described.

Additionally or alternatively, the remote device 200 can transmit the determined performance coefficient to be stored in the storage element 114 of the aircraft tire monitoring device 100 such that the performance coefficient can be utilised for future determination of the tire performance characteristic by the remote device 200.

Each of the examples of FIGS. 10, 11 and 12 enable determination of the tire performance characteristic in an efficient manner, which can reduce a time taken for a tire check to be performed, and/or enable additional functionality, even where the remote memory 502 is unavailable.

New Tire Monitoring Device and/or New Wheel

In the examples previously described tire performance characteristics and/or maintenance actions based on the tire performance characteristics can be determined, which can aid an operator with maintenance of the aircraft 300, and can result in enhanced operation of the aircraft 300 for example with reduced turn-around times. It will be appreciated, however, that sufficient pressure and temperature values obtained by the aircraft tire monitoring devices 100 may be required to determine either the performance coefficients or the tire performance characteristics.

Figure 13:
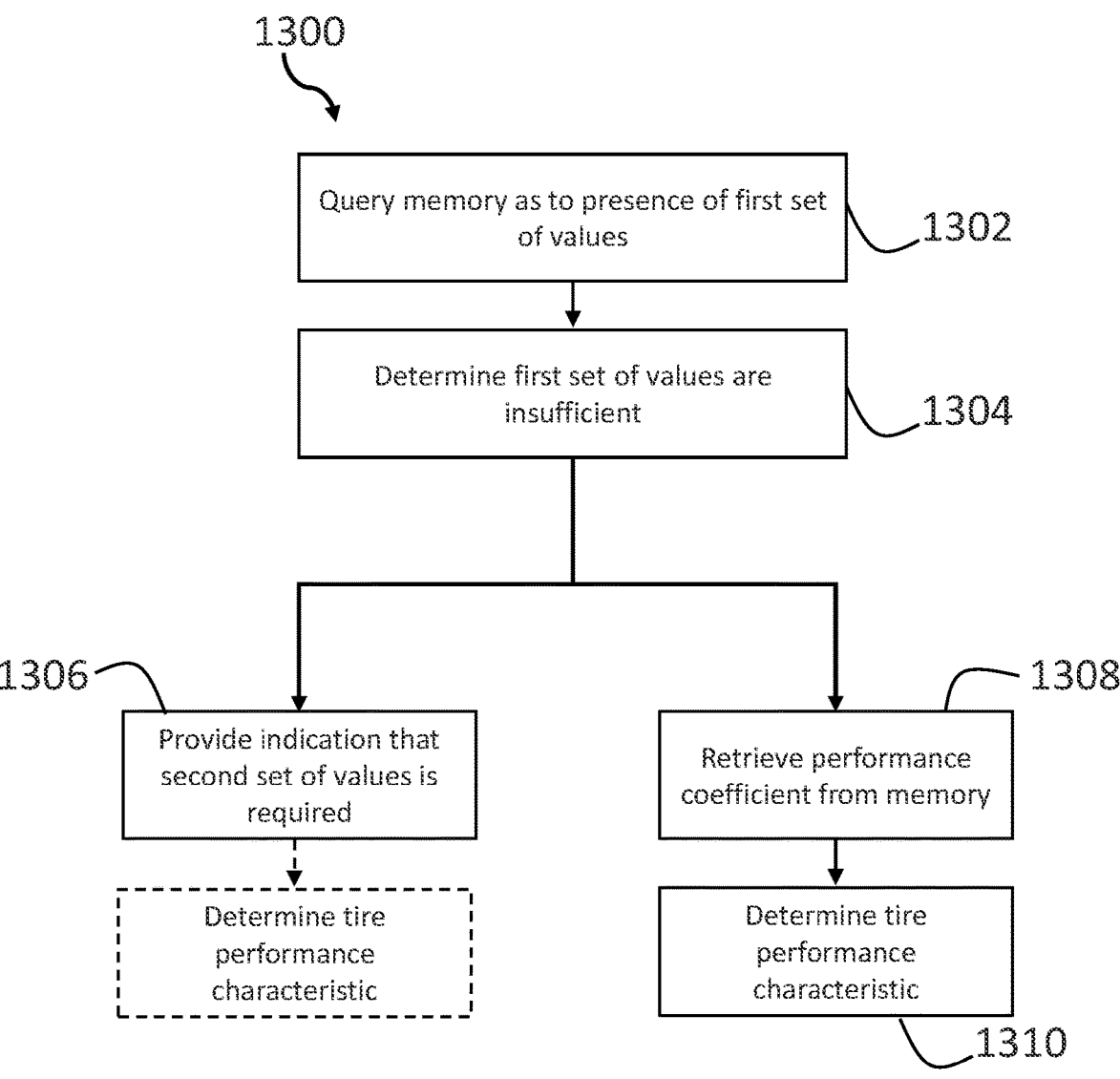
FIG. 13 shows a fifth method according to an example.

A method 1300 where insufficient values are available is shown in the flow diagram of FIG. 13. The method 1300 comprises querying 1302, using a processing system, a memory as to a presence of a first set of values indicative of a tire parameter of a tire in the memory, and determining 1304, using the processing system, that the first set of values is insufficient to determine the tire performance characteristic of the tire. The method 1300 comprises performing steps, using the processing system, comprising one or more of, providing 1306 an indication that a second set of values indicative of the tire parameter is required to determine the tire performance characteristic of the tire, and retrieving 1308, from the memory, a performance coefficient of the tire corresponding to performance of the tire associated with the first set of values, and determining 1310, based on the performance coefficient, the tire performance characteristic of the tire.

It will be appreciated that the remote computing device 504 can be considered a processing system, or part of a processing system, in accordance with the method 1300.

Where new tire monitoring devices 100 are installed on existing wheels, there may be a gap in tire parameter data, such as measured pressure and temperature values, of a tire associated with the wheel that means such tire parameter data is insufficient to determine a tire performance characteristic of the tire. By providing an indication that the second set of values indicative of the tire parameter is required to determine the tire performance characteristic of the tire, or by retrieving a performance coefficient from memory, determination of the tire performance characteristic may be performed even where a gap in tire parameter data is present.

Figure 14:
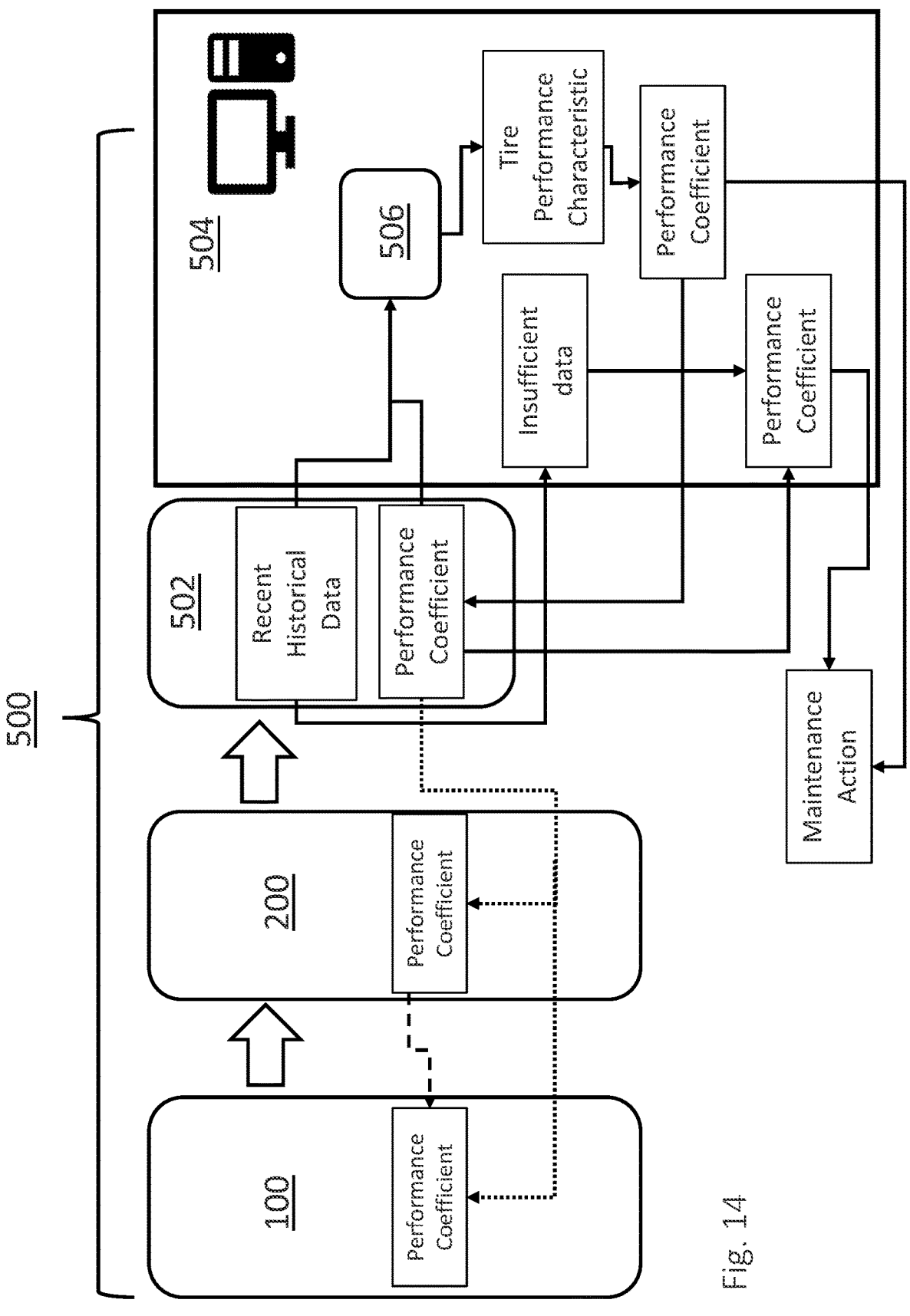
FIG. 14 shows a sixth schematic view of a tire performance monitoring system.

The method 1300 is further illustrated with reference to the schematic illustration of the tire performance monitoring system 500 of FIG. 14. Here the tire performance monitoring system 500 again comprises an aircraft tire monitoring device 100, the remote device 200, a remote memory 502, and a remote computing device 504.

As before, the aircraft tire monitoring device 100 is configured to wake-up every 10 minutes to measure pressure and temperature values using the respective pressure sensor 110 and temperature sensor 112. Such measured pressure and temperature values are stored in the respective first storage 114 of the aircraft tire monitoring device 100, i.e., in local memory of the aircraft tire monitoring device 100. When a tire pressure check is performed, for example once the aircraft tire monitoring devices 100 are connected to the remote device 200 following an appropriate request or command 408 in accordance with the method 400 described above, the remote device 200 downloads the measured pressure and temperature values and transmits the measured pressure and temperate values, or values based on the measured pressure and temperature values, for storage in the remote memory 502, alongside a corresponding wheel and/or aircraft tail identifier. The remote computing device 504 can query the remote memory 502 regarding the values stored therein. When a sufficient number of values for a given wheel have been obtained, for example values over a period of around 30 days, have been obtained, the remote computing device 504 obtains the pressure and temperature values for the wheel from the remote memory 502, and using those values its processor 506 determines a performance coefficient for the wheel. Such a performance coefficient is indicative of at least the pressure characteristics of the tire associated with the wheel over the 30 day period, and in some examples can also be based on a tire performance characteristic determined by the remote computing device 504 using the plurality of values from the 30 day period.

The determined performance coefficient is then stored in the remote memory 502 for future use. When subsequent values indicative of pressure and temperature of the tire associated with the given wheel are obtained by the aircraft tire monitoring device 100, and a tire pressure check is desired to be performed, these subsequent values are downloaded and transmitted by the remote device 200, in a similar manner to that described above, to the remote memory 502. When it is desired to determine a tire performance characteristic the remote computing device 504 obtains the subsequent values and the performance coefficient from the remote memory 502, and its processor 506 uses the subsequent values and the performance coefficient to determine the tire performance characteristic.

Where the aircraft tire monitoring device 100 for a given wheel needs to be replaced, there may be a gap in recent measured values, and/or no recent stable values. However, the performance coefficients are stored in the remote memory 502 for a given wheel, with an associated wheel ID and aircraft tail ID. When it is desired to determine a tire performance characteristic using the new aircraft tire monitoring device 100, the remote computing device 504 queries the remote memory 502 as to the presence of a set of values associated with the aircraft tire monitoring device 100, and determines that the set of values is insufficient to determine the tire performance characteristic. This can include, for example, determining that a size or cardinality of the set of values stored in the remote memory 502 is below a predetermined threshold, including that the set of values is an empty set of values. This can also include determining that there are no recent stable points in the set of values stored in the remote memory 502. This can also include determining that there are missing values from the values stored in the remote memory 502, for example by consideration of timestamps associated with the values stored in the remote memory 502.

In response to such a determination, the remote computing device 504 can obtain the performance coefficient from the remote memory 502, and utilise the performance coefficient, alongside what values are stored in the remote memory 502, to determine, via its processor 506, the tire performance characteristic in a manner similar to that discussed previously. Similarly, notifications and/or maintenance actions can be determined and/or provided in a manner similar to that discussed previously, for example provided using the display device 508.

In some examples, additionally or alternatively to obtaining the performance coefficient, the remote computing device 504 can provide an indication, or cause provision of an indication, that further pressure and/or temperature values are required. Such an indication can, in some examples, take the form of a status message displayed on the remote device 200 to an operator that further pressure and/or temperature values are required. Once the further values are obtained, the tire performance characteristic can be determined in the manner previously described. This may be equally applicable where, for example, a new aircraft tire monitoring device 100 is mounted to a new wheel, a new wheel is utilised, a new tire is utilised, or a tire is associated with a new wheel.

In some examples, additionally or alternatively to the remote computing device 504 obtaining the performance coefficient from the remote memory 502, and where the remote memory 502 is accessible, the performance coefficient can be transmitted to and stored by any of the remote device 200 and the aircraft tire monitoring device 100. This is indicated schematically by a dotted line in FIG. 14.

Similarly, where the remote memory 502 is inaccessible but the performance coefficient is already stored by the remote device 200, the performance coefficient can be transmitted to and stored by the aircraft tire monitoring device 100 where a new aircraft tire monitoring device is installed. This is illustrated by a dashed line in FIG. 14. If the remote memory is inaccessible, and there is no performance coefficient stored in the remote device 200, an indication, for example in the form of a status message, can be displayed on the remote device 200 to indicate to an operator that further pressure and/or temperature values are required.

In examples described herein, performance coefficients associated with performance of a tire over a first period of time are determined using obtained pressure and/or temperature values. Such performance coefficients are used in a variety of ways to determine tire performance characteristics, which can in turn be used to inform and improve aircraft maintenance procedures.

It is noted that the term "or" as used herein is to be interpreted to mean "and/or", unless expressly stated otherwise.

The invention claimed is:

1. A method of determining a tire performance characteristic of a tire, the method comprising:
   querying, using a processing system, a memory as to a presence of a first set of values indicative of a tire parameter of a tire in the memory;
   determining, using the processing system, that the first set of values is insufficient to determine the tire performance characteristic of the tire includes comparing a cardinality of the first set of values to a threshold, and determining that the cardinality is below the threshold; and
   performing steps, using the processing system, comprising one or more of:
      providing an indication that a second set of values indicative of the tire parameter is required to determine the tire performance characteristic of the tire; or
      retrieving, from the memory, a performance coefficient of the tire corresponding to performance of the tire associated with the first set of values, and determining, based on the performance coefficient, the tire performance characteristic of the tire.

2. The method according to claim 1, wherein the first set of values indicative of the tire parameter comprise historical measurements of the tire parameter.

3. A method of determining a tire performance characteristic of a tire, the method comprising:
   querying, using a processing system, a memory as to a presence of a first set of values indicative of a tire parameter of a tire in the memory;
   determining, using the processing system, that the first set of values is insufficient to determine the tire performance characteristic of the tire; and
   performing steps, using the processing system, comprising one or more of:

providing an indication that a second set of values indicative of the tire parameter is required to determine the tire performance characteristic of the tire; or retrieving, from the memory, a performance coefficient of the tire corresponding to performance of the tire associated with the first set of values, and determining, based on the performance coefficient, the tire performance characteristic of the tire, wherein the determination that the first set of values is insufficient to determine the tire performance characteristic of the tire is indicative of one or more of introduction of a new tire monitoring device associated with the tire, the tire comprising a new tire, and association of the tire with a new wheel.

4. The method according to claim 1, wherein the determination that the first set of values is insufficient to determine a tire performance characteristic of the tire further comprises determining that the first set of values is absent from the memory, and the method comprises providing an indication that a third set of values indicative of the tire parameter is required to determine a tire performance characteristic of the tire.

5. The method according to claim 1, wherein the determination that the first set of values is insufficient to determine the tire performance characteristic of the tire further comprises determining that the first set of values comprise one or more missing values.

6. The method according to claim 1, wherein the determination that the first set of values is insufficient to determine the tire performance characteristic of the tire further comprises determining that the first set of values is not indicative of stable points of the tire parameter.

7. The method according to claim 1, wherein the providing the indication that the second set of values is required to determine the tire performance characteristic further comprises providing an indication to a user to perform one or more tire monitoring processes to obtain the second set of values indicative of the tire parameter.

8. The method according to claim 1, further comprising:
obtaining the second set of values, and
determining, based on the second set of values, the tire performance characteristic of the tire.

9. The method according to claim 1, further comprising providing a notification to a user based on the tire performance characteristic.

10. The method according to claim 1, further comprising determining, based on the tire performance characteristic, a maintenance action to be performed on the tire.

11. The method according to claim 10, further comprising causing, based on the tire performance characteristic, the maintenance action to be performed on the tire.

12. The method according to claim 1, wherein:
the tire parameter comprises one or more of a tire pressure and a tire temperature; and/or
the tire performance characteristic comprises one or more of a rate of deflation of the tire, a predicted future inflation point of the tire, a pressure leakage rate of the tire, and a predicted time for the tire to cool to a predefined temperature.

13. The method according to claim 1, wherein the tire comprises an aircraft tire.

14. A tire performance monitoring system comprising:
a memory configured to store a first set of values indicative of a tire parameter of a tire; and
a processing system configured to:
query, the memory as to a presence of the first set of values;
determine that the first set of values is insufficient to determine a tire performance characteristic of the tire; and
perform steps comprising one or more of:
providing an indication that a second set of values indicative of the tire parameter is required to determine the tire performance characteristic of the tire; or
retrieving, from the memory, a performance coefficient of the tire corresponding to performance of the tire associated with the first set of values, and determining, based on the performance coefficient, the tire performance characteristic of the tire,
a tire monitoring device configured to obtain a plurality of measured values of the tire parameter, the tire monitoring device comprising a local memory configured to store the plurality of measured values; and
a remote device configured to retrieve the plurality of measured values from the local memory, and transmit, based on the plurality of measured values, the second set of values to the memory,
wherein the remote device is configured to provide, based on the indication that the second set of values indicative of the tire parameter is required to determine the tire performance characteristic of the tire, a notification to a user of the remote device that the second set of values is required.

15. The tire performance monitoring system according to claim 14, wherein the processing system is located remotely from a vehicle comprising the tire.

16. The tire performance monitoring system according to claim 14, wherein the processing system is configured to provide a notification to a user based on the tire performance characteristic.

17. The tire performance monitoring system according to claim 14, wherein the processing system is configured to determine, based on the tire performance characteristic, a maintenance action to be performed on the tire.

18. The method according to claim 3, wherein the determination that the first set of values is insufficient to determine a tire performance characteristic of the tire further comprises determining that the first set of values is absent from the memory, and the method comprises providing an indication that a third set of values indicative of the tire parameter is required to determine a tire performance characteristic of the tire.

19. The method according to claim 3, wherein the determination that the first set of values is insufficient to determine the tire performance characteristic of the tire further comprises determining that the first set of values comprise one or more missing values.

20. The method according to claim 3, wherein the determination that the first set of values is insufficient to determine the tire performance characteristic of the tire further comprises determining that the first set of values is not indicative of stable points of the tire parameter.

* * * * *